United States Patent
Hutai et al.

[11] 3,934,913
[45] Jan. 27, 1976

[54] BUMPER SUPPORT STRUCTURE

[75] Inventors: Hubert Hutai, Grafenau-Datzingen; Wolfgang Fischer, Leinfelden, both of Germany

[73] Assignee: Daimler-Benz Aktiengesellschaft, Germany

[22] Filed: Mar. 27, 1974

[21] Appl. No.: 455,412

[30] Foreign Application Priority Data
Mar. 27, 1973 Germany.............................. 2315105

[52] U.S. Cl..................................... 293/99; 293/63
[51] Int. Cl.²............................................ B60R 19/04
[58] Field of Search ............ 293/63, 85, 86, DIG. 2, 293/70, 99, 101; 267/116, 139; 280/106 R

[56] References Cited
UNITED STATES PATENTS

| | | | |
|---|---|---|---|
| 1,106,558 | 8/1914 | Halladay | 293/101 |
| 1,599,770 | 9/1926 | Jones | 293/86 |
| 1,773,928 | 8/1930 | Ambush | 293/85 |
| 3,096,116 | 7/1963 | Kost | 293/63 |
| 3,146,014 | 8/1964 | Kroell | 293/86 |
| 3,575,454 | 4/1971 | Meeker | 293/85 |
| 3,663,034 | 5/1972 | Barenyi et al. | 293/63 |
| 3,702,711 | 11/1972 | Beckley | 293/99 |
| 3,715,114 | 2/1973 | Thorsby et al. | 293/85 |

Primary Examiner—Robert S. Ward, Jr.
Assistant Examiner—Robert Saifer
Attorney, Agent, or Firm—Craig & Antonelli

[57] ABSTRACT

A motor vehicle with at least one bumper supported at the vehicle by way of impact absorbers and with longitudinal bearers that extend approximately in extension of the retraction direction of the impact absorbers; the impact absorbers are supported at the end faces of the longitudinal bearers by interposition of a structural part having a high buckling strength.

13 Claims, 1 Drawing Figure

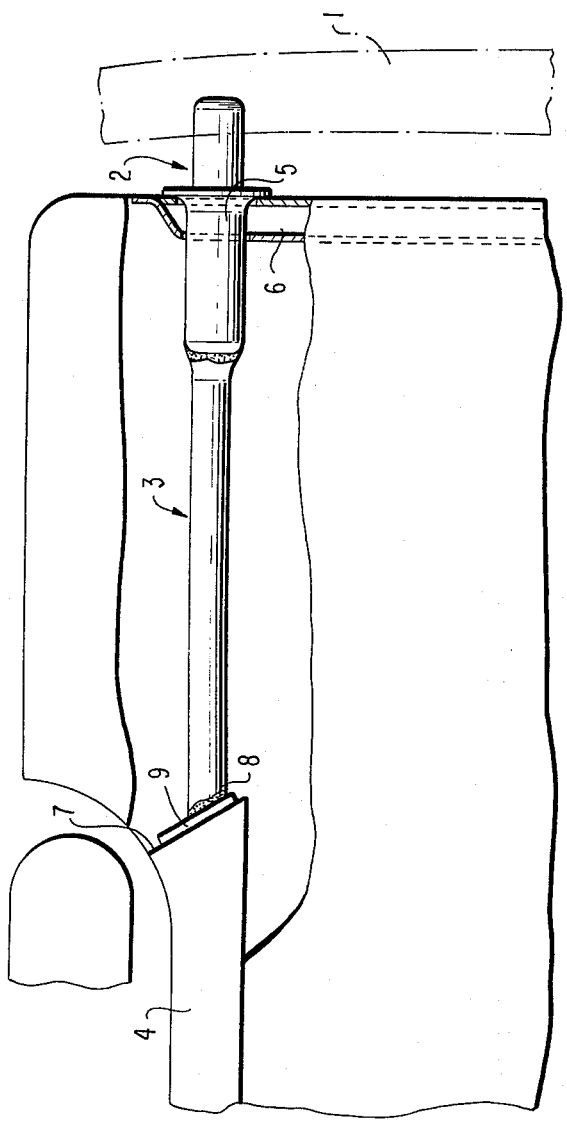

BUMPER SUPPORT STRUCTURE

The present invention relates to a motor vehicle with at least one bumper—which is fixedly supported at the vehicle by way of impact absorbers—and with longitudinal bearers which extend approximately in the extension of the retraction direction of the impact absorbers.

In vehicles which are thus equipped, the bumper retracts in case of an impact whereby the impact absorbers bring about an energy absorption. In order that the work capacity thereof is fully utilized, it is necessary to introduce the occurring forces into the vehicle in such a manner that no premature deformation occurs at vehicle body parts. This means that as a rule a considerable reinforcement of the motor vehicle end area has to be carried out because, based on experience, structural parts with pronounced load-bearing capabilities in the vehicle longitudinal direction are absent in these areas. This, however, leads to a considerable increase of the vehicle weight and simultaneously to a weight distribution unfavorably influencing the driving behavior.

It is the aim of the present invention to provide a possibility, under avoidance of the described disadvantages, to introduce the forces which become effective at the impact absorbers in case of a vehicle impact or collision, in a simple manner into supporting vehicle body parts or the like which can be stressed in compression.

Consequently, a motor vehicle with at least one bumper—which is supported at the vehicle by way of impact absorbers—and with longitudinal bearers is proposed which extend approximately in extension of the retraction direction of the impact absorbers, whereby according to the present invention, the impact absorbers are supported at the end faces of the longitudinal bearers under interposition or interconnection of a structural part which is resistant to buckling, and more particularly by interconnection of a structural part which has a relatively high buckling and compressive strength.

Tolerances in length can be readily compensated for, if the end faces of the longitudinal bearers are provided with a preferably unilateral or onesided bevelling, against which abuts the respective complementary free end of the buckling-resistant structural part. For the purpose of the tolerance compensation, as a rule, a slight inclined positioning of the buckling-resistant structural part thereby suffices already if the surface inclination of the bevelled surface amounts to about 30°.

In a preferred embodiment of the present invention, the portions of the impact absorbers of a respective vehicle side, which are fixed at the vehicle, are connected with each other by a cross bearer for the better force distribution.

Accordingly, it is an object of the present invention to provide a motor vehicle with at least one bumper which avoids by simple means the aforementioned shortcomings and drawbacks encountered in the prior art.

Another object of the present invention resides in a motor vehicle with at least one bumper in which a premature deformation of vehicle body parts is avoided without the need of increasing the weight of the end section of the vehicle by the incorporation of reinforcing structural elements.

A further object of the present invention resides in a motor vehicle with a retractable bumper in which the premature damage to body parts is avoided yet the driving behavior of the vehicle remains substantially uninfluenced.

A still further object of the present invention resides in a motor vehicle with at least one bumper in which the forces which become effective at the impact absorbers during a vehicle impact are introduced in a simple manner into bearer elements that can be stressed in compression.

Another object of the present invention resides in a bumper arrangement in a motor vehicle which not only brings about all of the aforementioned advantages but at the same time permits a ready compensation for tolerances in the length of the various parts.

These and other objects, features, and advantages of the present invention will become more apparent from the following description when taken in connection with the accompanying drawing which shows, for purposes of illustration only, one embodiment in accordance with the present invention, and wherein:

The single FIGURE is a somewhat schematic plan view, partly in cross section, of one embodiment of a bumper assembly in accordance with the present invention.

Referring now to the single FIGURE of the drawing, a bumper 1, indicated in dash and dot lines of a motor vehicle which is not illustrated in detail, is supported in the illustrated area at a vehicle longitudinal bearer 4 by way of an impact absorber generally designated by reference numeral 2 of any conventional construction which may be constructed, for example, as shock absorber, under interposition of a buckling-rigid structural part generally designated by reference numeral 3 which has a high buckling strength. The portions 5 of the impact absorber 2 which are fixed at the vehicle, of a respective vehicle side (front or rear section) are connected with each other by a cross bearer 6, by means of which the forces occurring during a vehicle impact are distributed proportionately to the buckling resistance structural parts 3 connected behind the impact absorbers.

In order to be able to compensate for manufacturing tolerances in a simple manner, each end face 7 of the longitudinal bearer 4 is bevelled off, whereby the free ends 8 of the buckling-resistant structural parts 3 have the same bevelling or inclination so that by a slight inclined position of the buckling-resistant structural parts 3, differences in length can be eliminated. In the thus-found position, the buckling-resistant structural parts 3 can be secured at the longitudinal bearer 4, for example, by way of an end-face base plate 9 by means of a threaded connection.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A motor vehicle which includes a vehicle body and at least one bumper means that is supported at the vehicle by way of impact absorber means, and longitudinal bearer means which extend approximately in extension of the retraction direction of the impact absorber means, characterized in that the impact absorber means are supported at end faces of the longitudinal bearer means by interposition of a buckling-resistant structural part which extends within the confines of the vehicle body, and wherein the end faces of the longitudinal bearer means are provided with a bevelled-off surface at which abuts the free end of the structural part which has a complementary bevelled surface.

2. A motor vehicle according to claim 1, characterized in that the bevelled surfaces are one-sided bevelled surfaces.

3. A motor vehicle according to claim 1, characterized in that the parts of the impact-absorber means which are fixed at the vehicle, of a respective vehicle side, are connected with each other by a cross bearer.

4. A motor vehicle according to claim 3, characterized in that the bevelled surfaces are one-sided bevelled surfaces.

5. A motor vehicle according to claim 3, characterized in that the structural part also possesses a high compressive strength.

6. A motor according to claim 3, characterized in that said cross bearer extends within the confines of said vehicle body.

7. A motor vehicle according to claim 1, characterized in that the structural part also possesses a high compressive strength.

8. A motor vehicle bumper arrangement comprising:
at least one bumper means supported at the vehicle by retractable impact shock absorber means, and
longitudinal bearer means extending approximately in extension of the retraction direction of the impact absorber means,
wherein each of said absorber means is supported by a buckling-resistant structural part having a bevelled surface thereof in contact with a complementary bevelled end face of a corresponding bearer means, and
wherein said face and said surface have a substantially constant bevel angle to accommodate manufacturing tolerances.

9. An arrangement according to claim 8, wherein parts of said impact absorber means are fixed at the vehicle and have housing surfaces connected with each other by cross bearer means extending transversely to said housing surfaces.

10. A motor vehicle bumper arrangement comprising:
at least one bumper means supported at the vehicle by retractable impact shock absorber means, and
longitudinal bearer means extending approximately in extension of the retraction direction of the impact absorber means,
wherein each of said absorber means is supported at an end face of said longitudinal bearer means by a buckling-resistant structural part,
wherein parts of said absorber means have housing surfaces interconnected by cross bearer means extending transversely to said housing surfaces, and
wherein each absorber means has a bevelled-off surface supported at each end face which has a complementary bevelled-off surface, and wherein each of said bevelled-off surfaces is planar.

11. An arrangement according to claim 10, wherein said parts are fixed at said vehicle.

12. A motor according to claim 1, characterized in that said faces and said complementary surface have a substantially constant bevel angle.

13. An arrangement according to claim 10, wherein said cross bearer means extends between said housing surfaces.

* * * * *